US012594575B1

(12) United States Patent
Calaman et al.

(10) Patent No.: US 12,594,575 B1
(45) Date of Patent: Apr. 7, 2026

(54) ADHESIVE DISPENSING SYSTEM AND METHOD

(71) Applicant: 4 C's Spray Equipment Rental LLC, Carlisle, PA (US)

(72) Inventors: Michael Jay Calaman, Carlisle, PA (US); Timothy E. Curtis, Carlisle, PA (US)

(73) Assignee: 4 C's Spray Equipment Rental, LLC, Carlisle, PA (US)

( * ) Notice: Subject to any disclaimer, the term of this patent is extended or adjusted under 35 U.S.C. 154(b) by 0 days.

(21) Appl. No.: 18/675,276

(22) Filed: May 28, 2024

Related U.S. Application Data

(63) Continuation of application No. 18/099,753, filed on Jan. 20, 2023, now Pat. No. 11,992,858, which is a continuation of application No. 16/918,340, filed on Jul. 1, 2020, now Pat. No. 11,559,820, which is a continuation of application No. 16/039,762, filed on Jul. 19, 2018, now Pat. No. 10,751,748.

(60) Provisional application No. 62/534,390, filed on Jul. 19, 2017.

(51) Int. Cl.

| | |
|---|---|
| ***B05C 17/00*** | (2006.01) |
| ***B05B 7/00*** | (2006.01) |
| ***B05B 7/02*** | (2006.01) |
| ***B05B 7/04*** | (2006.01) |
| ***B05B 7/08*** | (2006.01) |
| ***B05B 7/24*** | (2006.01) |

(52) U.S. Cl.
CPC .......... *B05C 17/002* (2013.01); *B05B 7/0081* (2013.01); *B05B 7/025* (2013.01); *B05B 7/0408* (2013.01); *B05B 7/0483* (2013.01); *B05B 7/0876* (2013.01); *B05B 7/241* (2013.01); *B05B 7/2497* (2013.01)

(58) Field of Classification Search
CPC ..... B05C 17/002; B05B 7/0081; B05B 7/025; B05B 7/0408; B05B 7/0483; B05B 7/0876; B05B 7/241; B05B 7/2497
See application file for complete search history.

(56) References Cited

U.S. PATENT DOCUMENTS

| | | | | |
|---|---|---|---|---|
| 2,136,024 A | | 11/1938 | Schneider | |
| 2,504,117 A | | 4/1950 | Downs | |
| 2,779,689 A | | 1/1957 | Reis, Jr. | |
| 3,008,808 A | | 11/1961 | Hodges | |
| 3,033,472 A | | 5/1962 | Shelton et al. | |
| 3,049,439 A | | 8/1962 | Coffman | |
| 3,179,341 A | | 4/1965 | Plos et al. | |
| 3,623,669 A | * | 11/1971 | Woods | B05B 7/2497 239/428 |
| 4,117,551 A | | 9/1978 | Brooks | |
| 4,169,545 A | | 10/1979 | Decker | |
| 4,295,439 A | | 10/1981 | Kruszona | |

(Continued)

OTHER PUBLICATIONS

Graco, Inc., "Instructions—Parts FUSION Plural Componentm Impingement Mix Air Purge Spray Gun", 2002, 2004.

(Continued)

*Primary Examiner* — Bob Zadeh
(74) *Attorney, Agent, or Firm* — Hooker & Habib, P.C.

(57) ABSTRACT

A dispenser system for applying multi-component adhesives or like substances to work surfaces in carpeting, roofing and like applications as well as a method of dispensing and applying multi-component adhesives to work surfaces.

20 Claims, 6 Drawing Sheets

(56) References Cited

U.S. PATENT DOCUMENTS

| | | | | |
|---|---|---|---|---|
| 4,428,530 | A * | 1/1984 | Chabria | B05B 15/55 239/113 |
| 4,460,126 | A | 7/1984 | Gates et al. | |
| 4,690,306 | A | 9/1987 | Stahell | |
| 4,765,509 | A | 8/1988 | Eisenhut et al. | |
| 4,846,405 | A | 7/1989 | Zimmermann | |
| 4,891,249 | A | 1/1990 | McIntyre | |
| 4,901,888 | A | 2/1990 | Standlick | |
| 5,053,202 | A | 10/1991 | Dwyer et al. | |
| 5,271,521 | A | 12/1993 | Noss et al. | |
| 5,279,569 | A * | 1/1994 | Neer | A61M 5/14546 222/327 |
| 5,388,763 | A | 2/1995 | Moses | |
| 5,388,768 | A | 2/1995 | Moses | |
| 5,678,764 | A | 10/1997 | Kulesh | |
| 5,887,755 | A * | 3/1999 | Hood, III | B01F 25/25 222/394 |
| 5,897,028 | A | 4/1999 | Sauer | |
| 6,012,647 | A | 1/2000 | Ruta et al. | |
| 6,045,057 | A | 4/2000 | Moor et al. | |
| 6,062,492 | A | 5/2000 | Tudor et al. | |
| 6,260,577 | B1 | 7/2001 | Keller | |
| 6,321,946 | B1 | 11/2001 | Merchant | |
| 6,572,031 | B2 | 6/2003 | Hunter et al. | |
| 6,607,099 | B2 | 8/2003 | Merchant et al. | |
| 6,616,068 | B2 | 9/2003 | Hunter | |
| 6,695,224 | B2 | 2/2004 | Hunter | |
| 6,824,071 | B1 | 11/2004 | McMichael | |
| 6,840,404 | B1 | 1/2005 | Schultz et al. | |
| 6,957,747 | B2 | 10/2005 | Peeler et al. | |
| 7,882,858 | B2 | 2/2011 | Keller | |
| 9,174,362 | B2 | 11/2015 | Monchamp et al. | |
| 9,242,846 | B2 | 1/2016 | Burns | |
| 9,498,792 | B2 | 11/2016 | Miller et al. | |
| 9,731,332 | B1 | 8/2017 | Smith et al. | |
| 10,434,538 | B2 * | 10/2019 | Calaman | B05B 7/0408 |
| 10,751,748 | B1 * | 8/2020 | Calaman | B05B 7/0876 |
| 11,224,887 | B1 * | 1/2022 | Calaman | B05B 7/025 |
| 11,559,820 | B1 * | 1/2023 | Calaman | B05C 17/002 |
| 11,992,858 | B1 * | 5/2024 | Calaman | B05B 7/0483 |
| 2002/0043280 | A1 | 4/2002 | Ochial et al. | |
| 2003/0192963 | A1 | 10/2003 | Ebberts | |
| 2004/0222235 | A1 | 11/2004 | Hayduk | |
| 2004/0226965 | A1 | 11/2004 | Rueschhoff | |
| 2005/0103889 | A1 | 5/2005 | Langeman | |
| 2007/0278247 | A1 | 12/2007 | Banks et al. | |
| 2008/0173728 | A1 | 7/2008 | Ilfrey | |
| 2008/0185097 | A1 | 8/2008 | Walter | |
| 2009/0084816 | A1 | 4/2009 | Varga | |
| 2013/0256337 | A1 | 10/2013 | Choiniere et al. | |
| 2015/0314309 | A1 | 11/2015 | Abbale | |
| 2016/0346801 | A1 | 12/2016 | Brudevold et al. | |
| 2017/0152848 | A1 | 6/2017 | Turczak | |
| 2017/0312769 | A1 | 11/2017 | Urquhart | |
| 2019/0022693 | A1 | 1/2019 | Calaman et al. | |

OTHER PUBLICATIONS

Carlisle Syntec Systems, “Flexible FAST Adhesive Product Data Sheet”, 2015.

* cited by examiner

ADHESIVE DISPENSING SYSTEM AND METHOD

FIELD OF THE DISCLOSURE

This disclosure relates to dispenser systems for applying adhesives or like substances to construction work surfaces in carpeting, roofing and like applications as well as a method of dispensing and applying such adhesives or like substances. In particular, the disclosure relates to dispensing systems and methods for applying two-component adhesives onto work surfaces in a low-pressure bead form and a low-pressure aerated spray form as well as allowing air purging of system passageways.

BACKGROUND OF THE DISCLOSURE

Dispenser systems that apply two-component polyurethane-based adhesives made up "resin" and "hardener" reactive component fluids are known. Conventionally, the component fluids are pumped from supply reservoirs, barrels or other containers to a dispensing head. The component fluids are then combined within a disposable application tip such as a static mixer tip. The reactive component fluids combine into an adhesive that is applied to work surfaces.

Construction projects necessitate adhesives to be applied to work surfaces in specific forms to achieve a desired degree of adhesion between the work surface and an applied material. For example, adhesive-applied roofing components may require a degree of adhesion corresponding to specific "wind uplift resistance" requirements. To meet wind uplift resistance requirements, adhesives may be applied in a high-pressure spray form or a low-pressure bead form.

Conventional high-pressure spray adhesive systems dispense adhesives at a high pressure of approximately 1000 psi in the form of atomized, fine droplets. While spray application allows for a reasonably uniform adhesives application on work surfaces to meet higher wind uplift resistance ratings, there are drawbacks. High-pressure sprays require high-pressure pumping systems to operate. These pumping systems contain high-pressure proportioning pumps that are expensive as well as difficult to maintain and operate.

Additionally, the end application of adhesives through a spray system is difficult to control. Atomized droplets can disperse and land away from target work surfaces, contaminating other undesired areas with adhesive. This necessitates the installation of protective barriers before application or clean up expense afterward. Also, spray system operators must wear special respiratory equipment to prevent inhalation of atomized droplets.

Conventional bead adhesive systems dispense adhesives at a lower pressure in the range of approximately 150 to 400 psi in a continuous single bead or stream. The bead is applied to the work surface at repeating intervals as required by a project, such as at 4, 6 or 12 inch on-center intervals along a work surface. A drawback of bead adhesive systems is that they do not provide a uniform layer of adhesive across the surface area of work surfaces. That is, bead adhesive systems provide non-uniform adhesive application to work surfaces. Bead adhesive systems are used for projects having lower adhesion or wind uplift resistance requirements than high-pressure spray applications.

Additionally, mixed component fluids can harden within the dispensing head and application tip passages after use, creating difficult to clear blockages.

SUMMARY OF THE DISCLOSURE

The disclosed adhesive dispensing system and method allows application of two-component adhesives onto work surfaces in different forms.

The system includes a two-stage pressurization system for applying two-component adhesives. Adhesives are pressurized by a proportioning pump and flown to a dispensing head. The dispensing head includes means for injecting the adhesives with preselected amounts of pressurized air to additionally pressurize and aerate the adhesives before mixing and dispensing.

Injected air aerates the adhesives, introducing air bubbles into the adhesives as well as additionally pressuring the adhesives. An operator regulates the amount of air injected with adhesives to control the degree of additional pressurization and aeration to achieve desired results. With no aeration, adhesives may be dispensed in a bead application. With aeration, adhesives may be dispensed in a low-pressure aerated spray application.

The low-pressure aerated spray allows for uniform application of adhesives onto the surface area of work surfaces.

The low-pressure aerated spray application provides a "spattering" or "splattering" application of adhesives onto work surfaces. The low-pressure aerated spray application covers an improved surface area of work surfaces over bead application without the use of expensive high-pressure pumping systems.

The low-pressure aerated spray application does not atomize adhesives to the same degree as high-pressure sprays. This allows for better control of the output adhesive stream and improves adhesive application to target work surfaces without contaminating undesired areas with atomized adhesive. Reduced atomization of adhesive into the atmosphere may reduce or negate the need for operators to wear respiratory equipment.

Adhesives applied from the disclosed low-pressure aerated spray application obtain substantially uniform coverage of target surface areas on work surfaces.

In embodiments, the disclosed system allows the application of dispensed adhesive to be modified to alter the dispensing rate and force of the aerated spray. The aerated spray can be modified to cover the surface area of a given target work surfaces in order to meet project adhesion or wind uplift resistance requirements.

The process injecting pressurized air into component fluids to achieve aeration before mixing improves mixing thoroughness in the end-combined adhesive. Adhesives dispensed by the system cure into an improved form having smaller air cell structure over like multi-component adhesives applied by prior art dispensing systems.

The system also allows air purging to prevent the formation of dispensing head and application tip passage blockages.

DISCLOSURE

Figure 1:
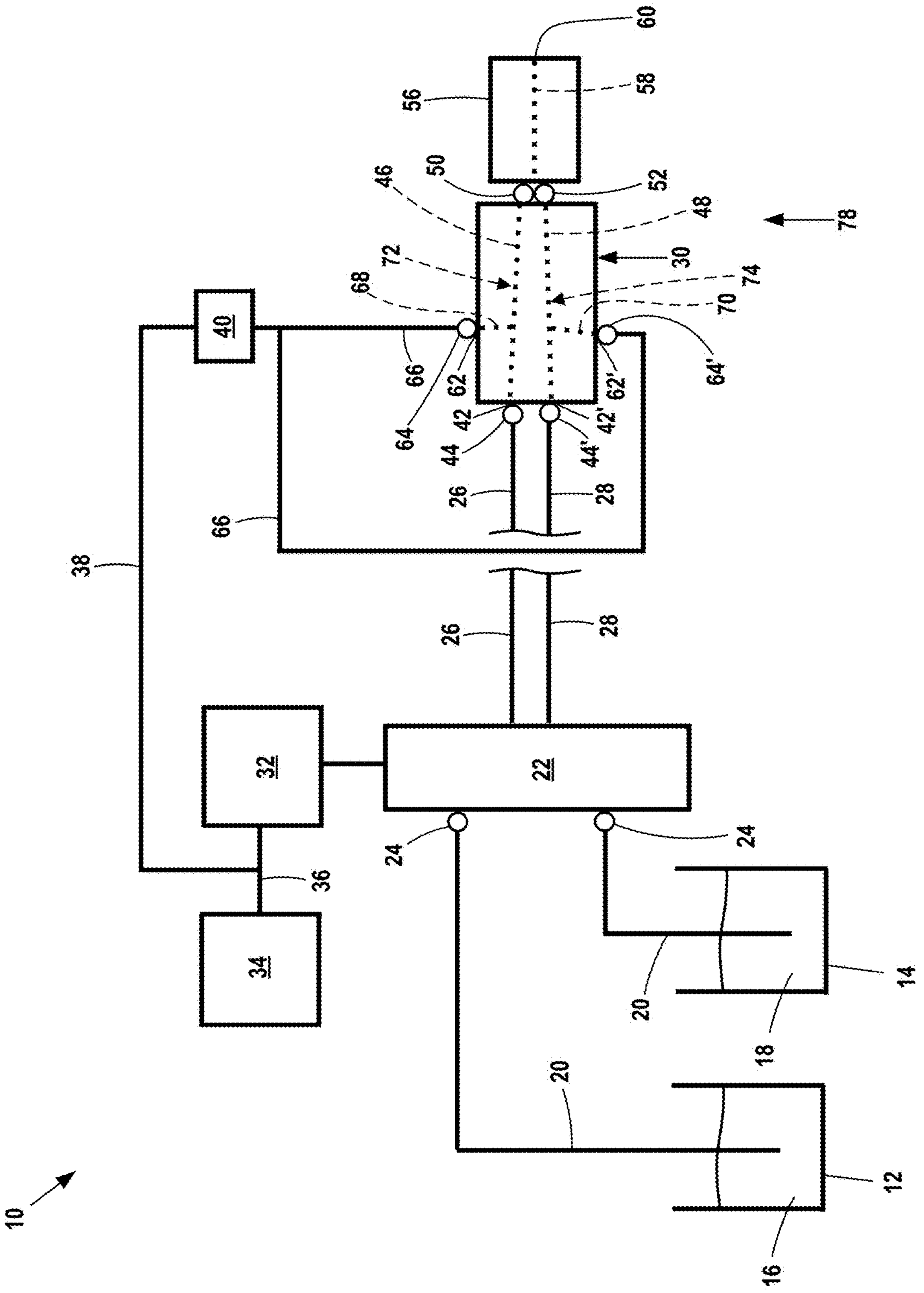
FIG. 1 is a representational hydraulic view of the adhesive dispenser system.

A hydraulic representation of adhesive dispenser system 10 is shown in FIG. 1. System 10 allows metered dispensing of adhesive component fluids from storage containers 12, 14. Containers 12, 14 contain adhesive component fluids 16, 18. Fluids 16, 18 may be known reactive adhesive resin and hardener components for forming an adhesive. Fluids 16, 18 may be known two-part, epoxy-based or urethane-based component fluids for forming an adhesive.

In embodiments, fluids 16, 18 may be two-part urethane-based adhesive fluids wherein one fluid containing a polymetric isocyanate substance and the other fluid contains a surfactant and catalysis containing substance. In further embodiments, fluids 16, 18 may be a "Flexible FAST Adhesive" brand two-part urethane-based adhesive manufactured by Carlisle Syntec Systems.

System 10 draws fluids 16, 18 from each container 12, 14 by connector lines 20 extended into each container. Each connector line 20 is joined to a metering pump 22. The metering pump inlets may include ball check valves 24 to prevent fluid back flow during pump operation.

Metering pump 22 may have two piston pumps or may have different flow capacities to enable drawing a desired amount of fluid from each container to outlet connector lines 26, 28 and to dispenser head 30.

In embodiments, metering pump 22 may be driven by an air motor 32 powered by an air compressor or other pressurized or compressed air source 34. Pressurized air source 34 provides pressured air through line 36 to motor 32. Air line 38 is joined to line 36 to provide pressured air to the inlet of regulator valve 40 as explained below. Regulator valve 40 may include a pressure gauge and pressure adjustment valve or like means to monitor and regulate air flow through valve 40.

In alternate embodiments, pump 22 may be an electric or hydraulic pump, and pressured air may be provided directly to the inlet of regulator valve 40.

Fluids 16, 18 are pumped from metering pump 22 to outlet hoses 26, 28 and to dispensing head 30. Head fluid inlets 42, 42' receive hoses 26, 28 to allow fluid to flow through head component fluid passages 46, 48 to outlet apertures 50, 52.

Head fluid inlets 42, 42' may include head inlet valves 44, 44' to control the flow of fluids 16, 18 into head 30. Head inlet valves 44, 44' may be actuated in unison by a single handle 82 as explained below and shown in FIGS. 7-9.

In alternate embodiments, head inlet valves 44, 44' may be actuated independently of one another.

Dispensing head 30 is shown in detail in FIGS. 3-6.

Dispensing head 30 includes a threaded outlet fitting 54 adapted for attachment to a conventional disposable adhesive fluid mixing tip 56. A mixing tip 56 is installed onto outlet fitting 54 and includes a mixing tip passage 58 extending to tip outlet 60. Mixing tip passage 58 may include a number of static mixing elements that facilitate combination of fluids 16 and 18 into a combined adhesive as the system dispenses adhesive.

Dispensing head 30 includes air inlets 62, 62'. Air lines 66 extend between the outlet of regulator valve 40 and air inlets 62, 62'. Air lines 66 allow pressured air to flow downstream from pressurized air source 34 through regulator valve 40 to inlets 62, 62' as regulator valve 40 is actuated from a closed position to an open position. Regulator valve 40 is located upstream of head inlets 62, 62' and controls the flow of pressured air to both head inlets 62, 62'. Inlets 62, 62' may include ball check valves 64, 64' to prevent fluid back flow into lines 66 during system operation.

Regulator valve 40 may be variably actuated from a fully closed position to a fully open position. In the fully closed position no air is delivered to dispensing head inlets 62, 62'. In a fully open position, maximum air flow is delivered to dispensing head inlets 62, 62'. Maximum air flow depends in part on the capacity of pressurized air source or air compressor 34 and may be produced by air pressure of about 150 psi. In use, regulator valve 40 may be actuated between closed and opened positions to deliver a desired air flow to dispensing head inlets 62, 62' as explained in greater detail below.

Head air passages 68 and 70 extend from head air inlets 62, 62' and through head 30 to head component fluid passages 46, 48.

Head component fluid passage 46 and air passage 68 co-operate to form first air/fluid mixing passage 72 within head 30. First air/fluid passage 72 may be referred to herein as first air and fluid passage 72. Head component fluid passage 48 and air passage 70 co-operate to form second air/fluid mixing passage 74 within head 30. Second air/fluid passage 74 may be referred to herein as second air and fluid passage 74.

Figure 3:
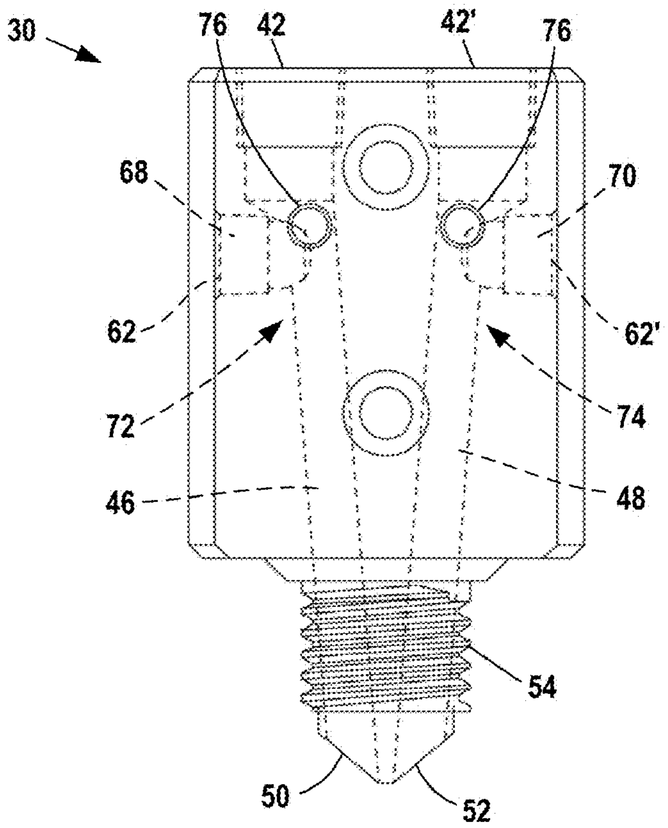
FIG. 3 is a top view of a system dispensing head.
Figure 4:
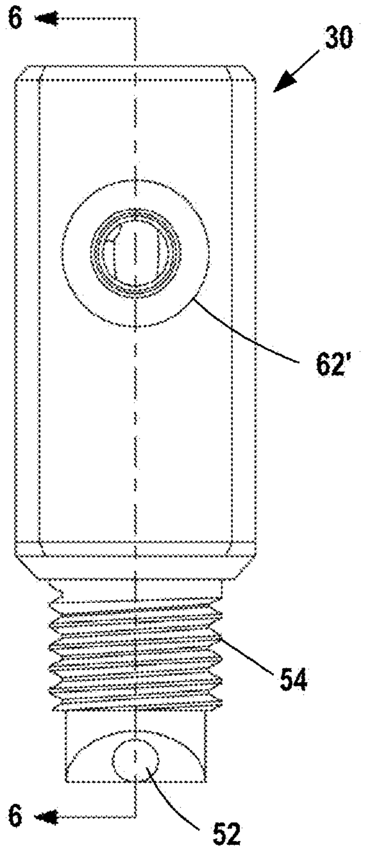
FIG. 4 is a side view of the system dispensing head.
Figure 5:
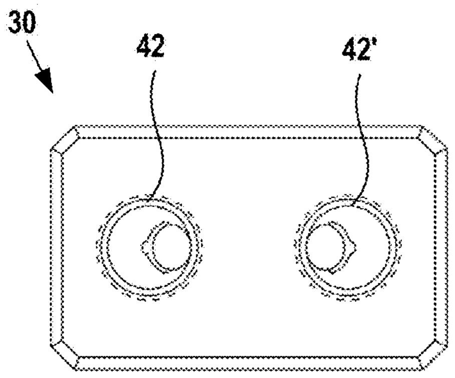
FIG. 5 is a rear view of the system dispensing head.
Figure 6:
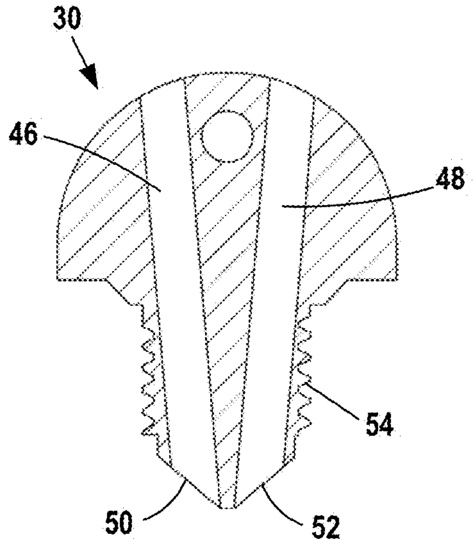
FIG. 6 is a partial sectional view taken along line 6-6 of FIG. 4.

As shown in FIG. 3, dispensing head 30 may include grease valve inlets 76 for applying grease to head passages 46, 48, 68 and 70 to prevent air from entering the passages when the system is not in use.

Figure 7:
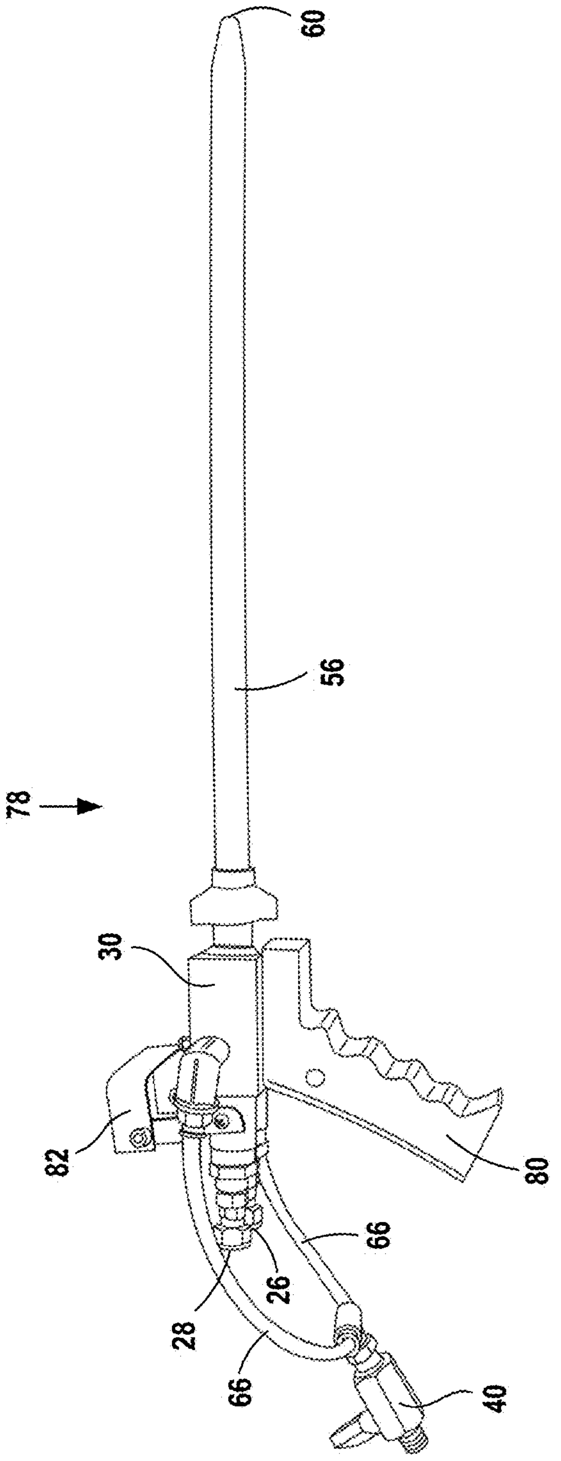
FIG. 7 is a perspective view of system elements including the system dispensing head.
Figure 8:
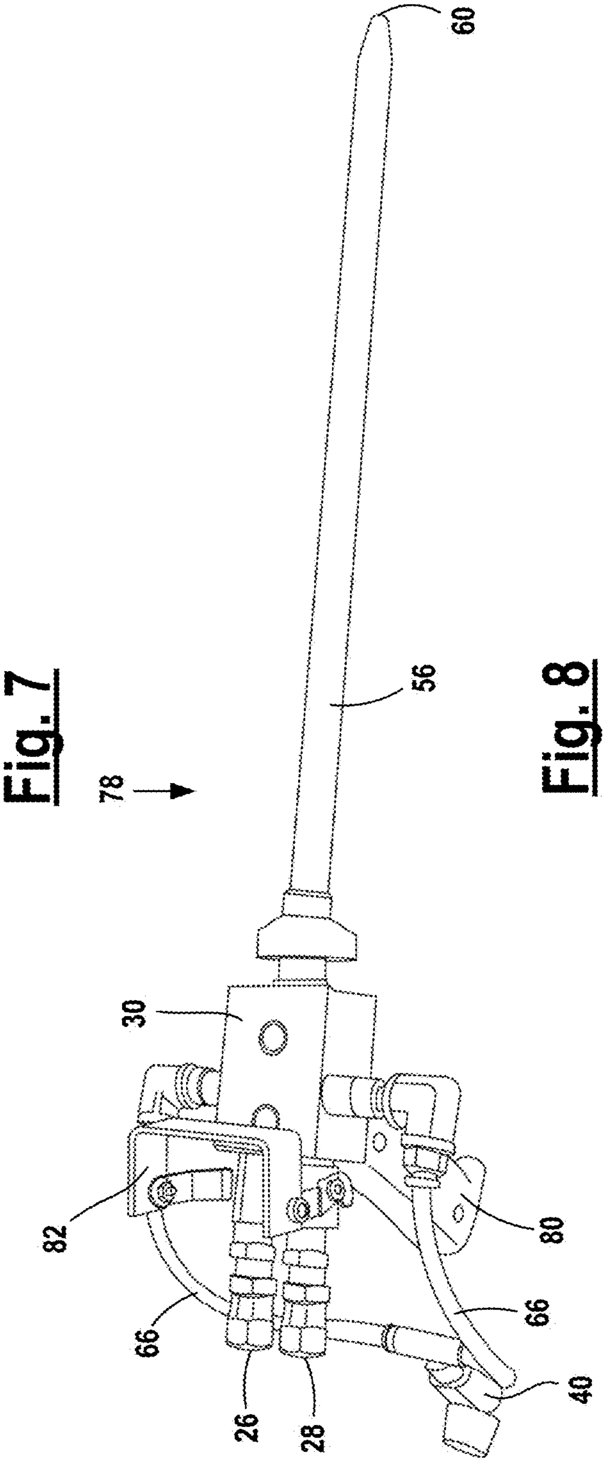
FIG. 8 is a perspective view of system elements including the system dispensing head.
Figure 9:
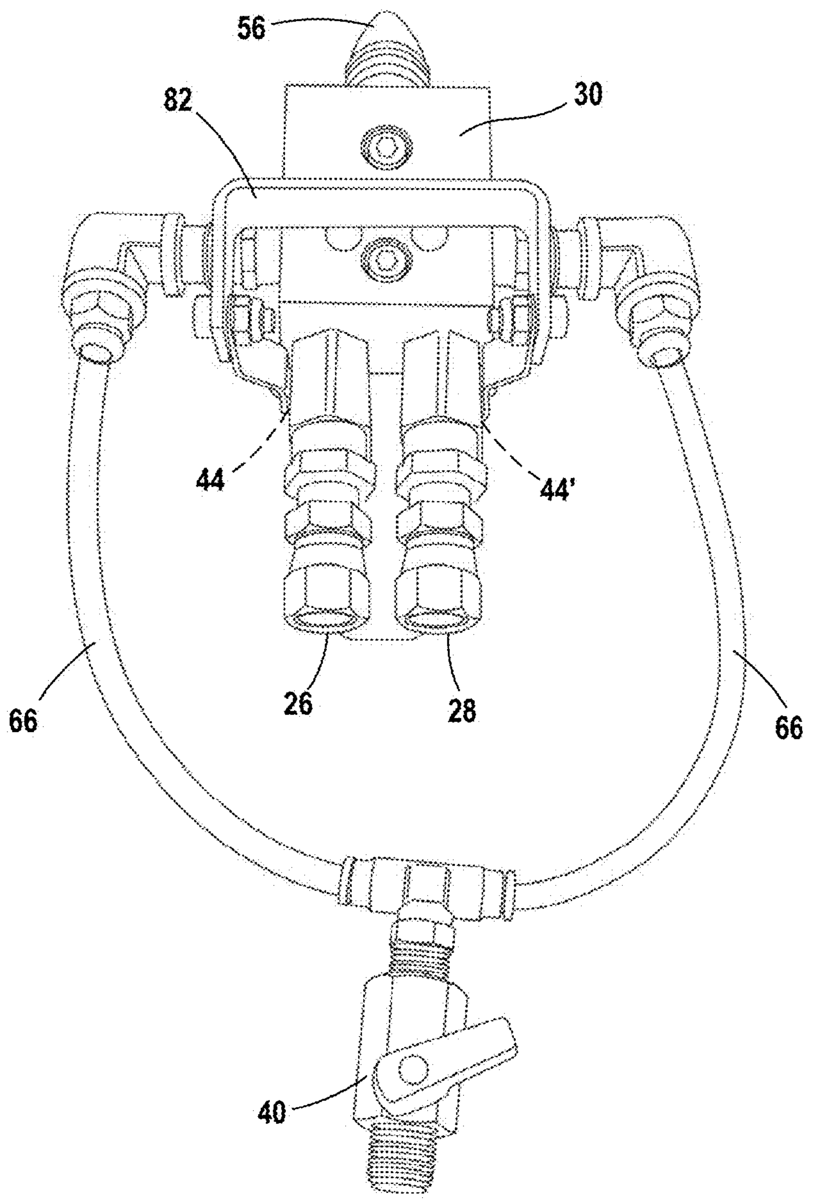
FIG. 9 is a rear perspective view of system elements including the system dispensing head.

Adhesive dispenser system 10 may include a dispensing gun 78 to facilitate system operation. Gun 78 substantially includes head 30 and may include a hand grip 80 mounted to head 30 as shown in FIGS. 7-9. Gun 78 may also include a handle 82 joined to head inlet valves 44, 44' to allow actuation of valves 44, 44' in unison.

Figure 2:
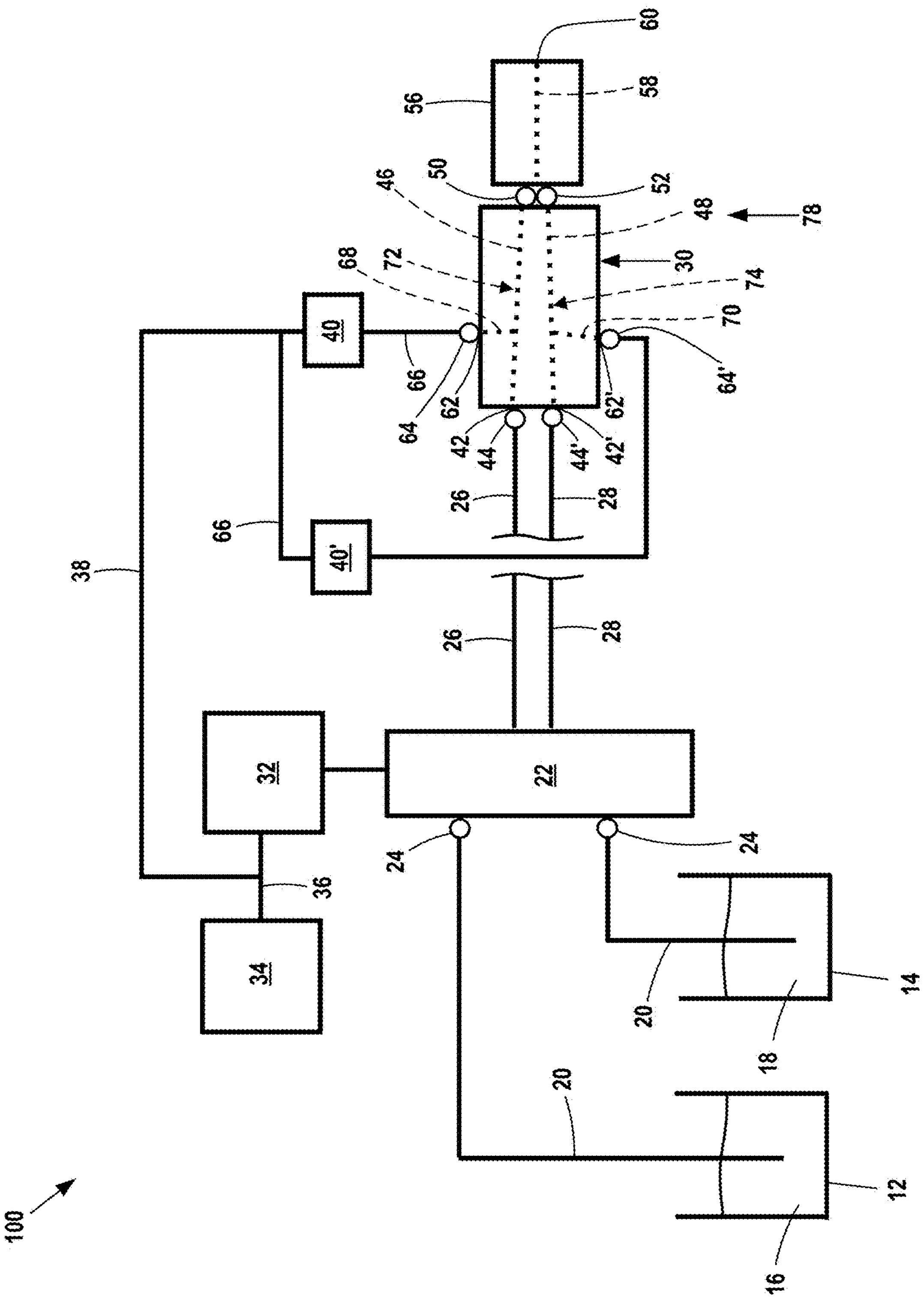
FIG. 2 is a representational hydraulic view of an alternate embodiment adhesive dispenser system.

A hydraulic representation of an alternate embodiment adhesive dispenser system 100 is shown in FIG. 2. System 100 is substantially similar to above-described system 10 and is made up of similar elements as described above.

System 100 differs from system 10 in that system 100 includes two regulator valves 40, 40' in air lines 66. Like regulator valve 40, valve 40' may each be variably actuated from closed to open positions to control the flow of pressured air to head air inlets 62, 62'.

A regulator valve 40, 40' is located upstream of each head inlet 62, 62' to control the flow of pressured air to each head inlet 62, 62' individually. Valves 40' may be actuated in unison or independently from one another. The actuation of valves 40 and 40' independently from one another allows a user to flow different amounts of pressured air to each dispensing head air inlet 62, 62' and air/fluid mixing passages 72, 74.

Dispensing head 30 includes air inlets 62, 62'. Air lines 66 extend between the outlet of regulator valve 40, 40' and an air inlet 62, 62'. Air lines 66 allow pressured air to flow downstream from pressurized air source 34 through a regulator valve 40, 40' to an inlet 62, 62' as a regulator valve 40. 40' is actuated from a closed position to an open position. Regulator valves 40, 40' are located upstream of head inlets 62, 62' to controls the flow of pressured air to head inlets 62, 62'. Inlets 62, 62' may include ball check valves 64, 64' to prevent fluid back flow into lines 66, 38 during system operation.

Use of the system 10 will now be explained.

System 10 is capable of applying two-component adhesives onto work surfaces in either a bead application or in a low-pressure aerated spray application.

In dispensing two-component adhesives in a low-pressure bead application, fluids 16, 18 are pumped from containers 12, 14, through pump 22 and to dispensing head 30.

Pump 22 may pressurize fluids 16, 18 to a range of about 100 psi to 800 psi in order to flow fluids 16, 18 at a commensurate flow rate through system 10.

At head 30, the fluids pass through head component fluid passages 46, 48 to outlet apertures 50, 52 and into mixing tip 56. Fluids 16, 18 combine within mixing tip passage 58 to form an adhesive bead that is dispensed at tip outlet 60.

When using system 10 shown in FIG. 1 to apply a low-pressure adhesive bead, regulator valve 40 is fully closed. Likewise, when using system 100 shown in FIG. 2 to apply a low-pressure adhesive bead, regulator valves 40 and 40' are fully closed.

In use of system 10 to apply a low-pressure aerated spray application of adhesive, fluids 16, 18 are pumped from containers 12, 14 by pump 22 to dispensing head 30. Pump 22 may pressurize fluids 16, 18 in a range of about 100 psi to 800 psi. In embodiments, pump 22 pressurizes fluids 16, 18 to about 500 psi.

At head 30, pressurized fluids 16, 18 enter head passages 46, 48. As fluids 16, 18 enter head passages 46, 48, regulator valve 40 is actuated from a closed position to an open position to allow pressurized air from compressor 34 through line 66 and head inlets 64, 64' into head air passages 68 and 70.

As pressurized air is introduced into first and second air/fluid mixing passages 70 and 72, fluids 16 and 18 are additionally pressurized. Depending on adhesive application requirements for a given project and desired spray dispersion, fluids 16, 18 may be additionally pressurized in a range of about 10 psi to 150 psi. In embodiments, fluids 16, 18 may be additionally pressurized about 30 psi.

Also, as fluids 16 and 18 are additionally pressurized within first and second air/fluid mixing passages 70 and 72, fluids 16 and 18 may be aerated to introduce air bubbles into fluids 16 and 18.

Additionally pressurized fluids 16, 18 then flow out of passages 46, 48 to outlet apertures 50, 52 and into mixing tip 56. Additionally pressurized fluids 16, 18 are combined within tip passage 58 and dispensed at tip outlet 60 as an adhesive spray.

The dispensing rate, force and nature of the low-pressure aerated adhesive spray dispensed at tip outlet 60 depends upon the degree of additional pressurization and aeration of fluids 16 and 18 achieved in first and second air/fluid mixing passages 70 and 72.

During operation of system 10, the degree of additional pressurization aeration is introducing and achieved by pressurized air into air/fluid mixing passages 70 and 72 by actuating regulator valve 40. When valve 40 is in a closed position, no pressurized air is introduced into air/fluid mixing passages 70 and 72 and an adhesive bead is dispensed as described above. As valve 40 is actuated from a closed position to an open positon, pressurized air is introduced into air/fluid mixing passages 70 and 72 and an adhesive spray is dispensed at tip outlet 60.

The adhesive spray is made up of adhesive droplets formed from mixed fluids 16, 18. The adhesive droplets become more-finely atomized from larger droplets to smaller droplets as valve 40 is opened and more pressurized air is introduced into air/fluid mixing passages 70 and 72 to additionally pressurize and aerate fluids 16, 18.

The injection of pressurized air into air/fluid mixing passages 70 and 72 to aerate fluids 16, 18 also allows for an improved mixing of fluids 16, 18 within mixing tip. As indicated, in forming the low-pressure aerated spray, aerated fluids 16, 18 are combined in mixing tip 56. The mixing of aerated fluids 16, 18 is more thorough than the mixing of non-aerated fluids 16, 18 under bead application of the adhesive.

The mixing of aerated fluids 16, 18, allows for an improved chemical reaction between fluids 16, 18. This improved chemical reaction allows formation of a cured adhesive having improved, smaller and finer cell structure over adhesive beads and adhesives applied by prior art spray systems. The cell structure of cured adhesive applied by a low-pressure aerated spray from systems 10, 100 has smaller air pockets or voids than a conventionally-applied adhesive bead as explained in more detail below.

Use of system 100 to apply a low-pressure aerated spay is substantially similar to use of system 10 to apply a low-pressure aerated spay. As indicated above, system 100 valves 40, 40' may be actuated in unison from closed to open positions. Unison operation of valves 40, 40' allows system 100 to operate like system 10 to allow like flows of pressured air to head air inlets 62, 62' and to air/fluid mixing passages 72 and 74. This allows the pressurization and aeration of fluids 16, 18 within passages 72 and 74 to be substantially identical.

Alternatively, system 100 valves 40, 40' may be actuated independently from one another to allow a user to flow different amounts of pressured air to each dispensing head air inlet 62, 62' and to air/fluid mixing passages 72 and 74. This allows the pressurization and aeration of fluids 16, 18 within passages 72 and 74 to be different if desired.

Figure 10:
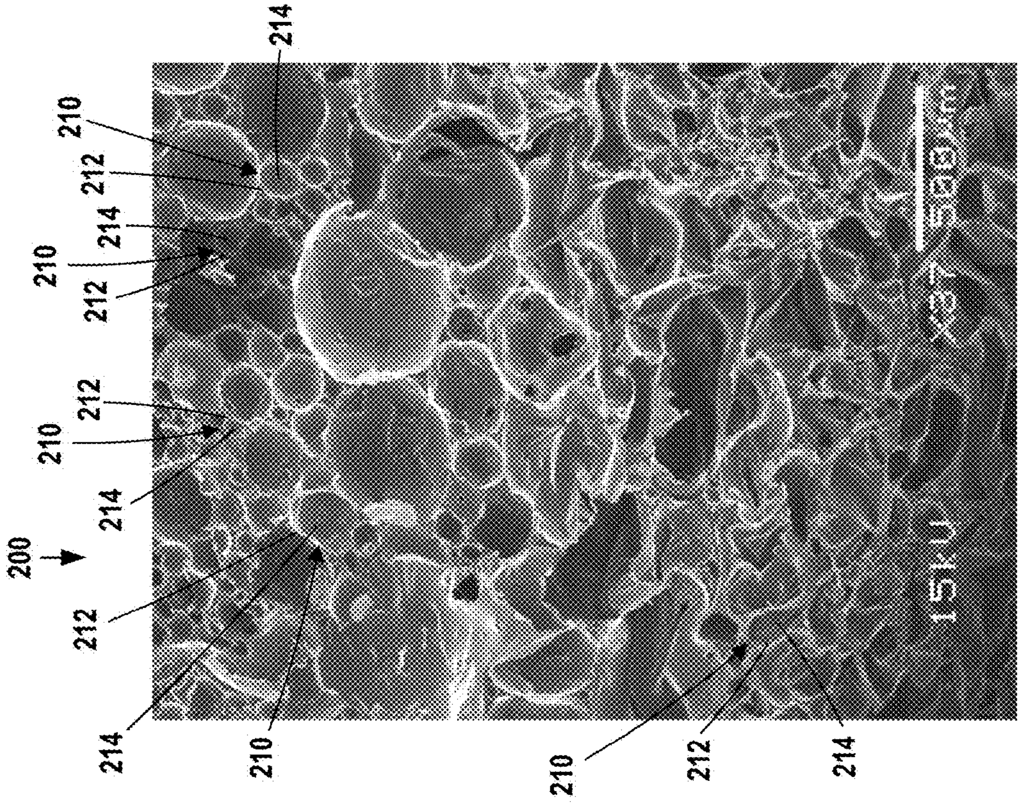
FIG. 10 is a cross-sectional exemplary digital image of a scanning electron microscope image taken at 37× magnification of cured adhesive applied by the disclosed system.

FIG. 10 is a digital image of a scanning electron microscope micrograph. The image is an exemplary cross-sectional view of cured adhesive 200 applied in low-pressure aerated spray application form by a system 10, 100. The illustrated adhesive 200 was applied by operating system 10, 100 as described above. Specifically, system pump 22 pressurized fluids 16, 18 to approximately 500 psi, whereupon the fluids were flowed to head 30 and additionally pressurized and aerated within air/fluid mixing passages 70 and 72 by pressurized air introduced to passages 70 and 72 at approximately 30 psi.

Cured adhesive 200 is made up of a number of cells 210 defined by cell walls 212 and interior air pockets or voids 214.

Evaluating multiple samples of cured adhesive 200 applied in low-pressure aerated spray application form by a system 10, 100 as described above indicates that the average cell 210 diameter size, as measured along the major axis of each cell, is 170 micrometers, with minimum sized outlier cell diameters size measured at 37 micrometers and maximum sized outlier cell diameters size measured at 595 micrometers.

Figure 11:
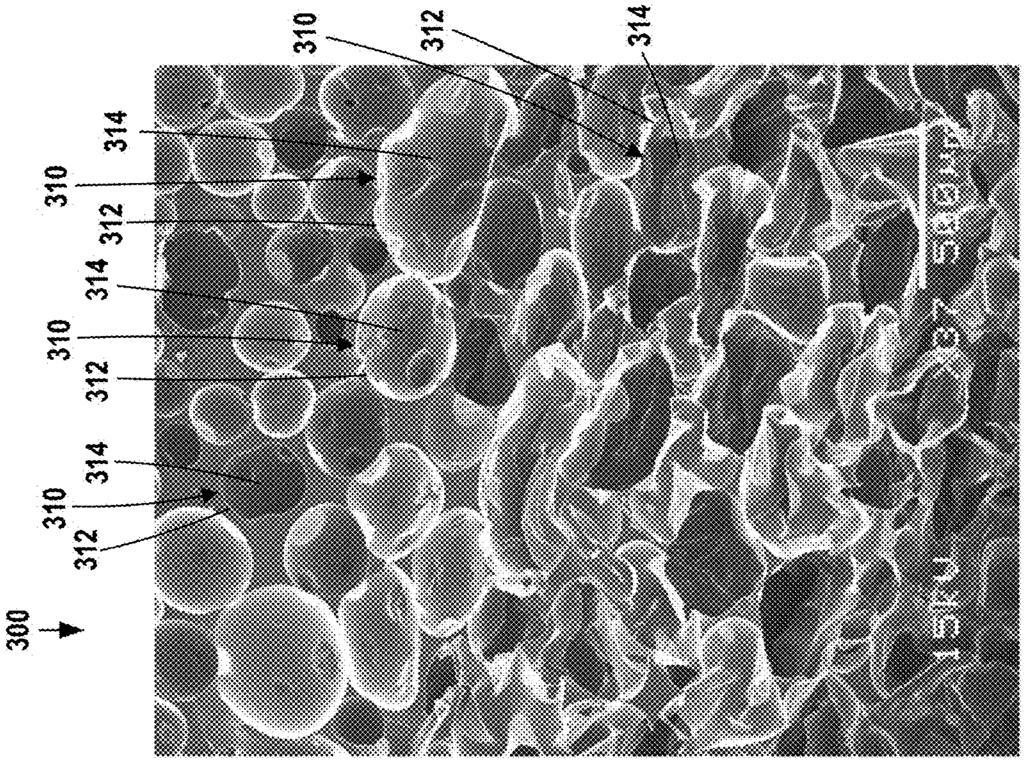
Fig. 11 (Prior Art)
FIG. 11 is a cross-sectional exemplary digital image of a scanning electron microscope image taken at 37× magnification of cured adhesive applied by a prior art high-pressure fusion gun system.

By contrast, FIG. 11 is a digital image of a scanning electron microscope micrograph showing an exemplary cross-sectional view of cured adhesive 300 applied by a conventional high-pressure spray adhesive system, namely a "Fusion" brand plural component, impingement mix air purge spray gun manufactured by GRACO, Inc. operating at 800 psi.

Cured adhesive 300 is made up of a number of cells 310 defined by cell walls 312 and interior air pockets or voids 314.

Evaluating multiple samples of cured adhesive 300 applied by the high-pressure spray gun described above, indicates that the average cell 310 diameter size, as measured along the major axis of each cell, is 310 micrometers, with minimum sized outlier cell diameters size measured at 120 micrometers and maximum sized outlier cell diameters size measured at 680 micrometers.

Use of system 10, 100 for the low-pressure aerated spray application of two-part adhesives forms a cured adhesive 200 having improved, smaller and finer cell structure over cured adhesive 300 applied by prior art spray systems. The average cell 210 diameter size of 170 micrometers is nearly half the average cell 310 diameter size of 310 micrometers. The smaller average size of cells 210 in cured adhesive 200 provides improved structural and adhesion characteristics over cured adhesive 300 having larger cells 310 so that cured adhesive 200 provides performance at least matching that of cured adhesive 300.

System 10 and 100 application of adhesive through a low-pressure aerated spray allows for uniform application of adhesives onto work surfaces to meet wind uplift resistance requirements for construction projects that are equivalent to or better than adhesive bead application at 4 inch on-center intervals and comparable to more expensive high-pressure spray adhesive systems.

When adhesive application is complete, systems 10 and 100 allow air purging to prevent the formation of cured adhesive blockages in the dispensing head and application tip passages. To achieve air purging, the flow of fluids 16, 18 to mixing head 30 is halted by actuating handle 82 to close valves 44, 44' at head inlets 42, 42'. Regulator valve 40 or valves 40, 40' are then actuated to an open position to allow pressurized air to flow through the head and mixing tip passages to clear unused fluids 16, 18 from the passages and out of tip outlet 60. Regulator valves 40, 40' are closed after the passages are purged of fluid.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art, as well as such changes and alterations that fall within the purview of the following claims.

What is claimed is:

1. A method for forming a cured adhesive comprising the steps of:

(a) providing a first adhesive component fluid stored within a first fluid storage container;

(b) providing a second adhesive component fluid stored within a second fluid storage container;

(c) providing a dispensing head having a first head passage extending from an upstream first head passage inlet to a downstream first head passage outlet and a second head passage extending from an upstream second head passage inlet to a downstream second head passage outlet, said second head passage not in fluid communication with said first head passage;

(d) providing a first connector line joining said first fluid storage container to said first head passage inlet;

(e) providing a second connector line joining said second fluid storage container to said second head passage inlet;

(f) providing a mixing tip having a mixing tip passage extending from an upstream mixing tip passage inlet to a downstream mixing tip passage outlet, said first head passage outlet and said second head passage outlet joined to said mixing tip passage inlet;

(g) flowing said first adhesive component fluid from said first fluid storage container through said first connector line to said first head passage and to said mixing tip passage;

(h) flowing said second adhesive component fluid from said second fluid storage container through said second connector line to said second head passage to said mixing tip passage;

(i) mixing said first adhesive component fluid and second adhesive component fluids within said mixing tip passage to form an adhesive;

(j) aerating at least one of said first adhesive component fluid or said second adhesive component fluid or said adhesive upstream of said mixing tip passage inlet;

(k) dispensing said adhesive from said mixing tip passage outlet onto a work surface; and (l) curing said adhesive on said work surface to form a cured adhesive comprising a plurality of cell bodies, one or more of said cell bodies comprising a cell wall surrounding a void and an interior cell body diameter extending between opposed cell walls and wherein the average cell body diameter of said plurality of cell bodies is 170 micrometers.

2. The method of claim 1 wherein step (j) comprises aerating at least one of said first adhesive component fluid or said second adhesive component in at least one of said first connector line or said second connector line.

3. The method of claim 1 wherein step (j) comprises aerating at least one of said first adhesive component fluid or said second adhesive component in at least one of said first head passage or said second head passage.

4. The method of claim 1 wherein step (j) comprises aerating at least one of said first adhesive component fluid or said second adhesive component downstream of said first head passage outlet and said second passage outlet.

5. The method of claim 1 wherein step (g) comprises flowing said first adhesive component fluid pressurized in a range of 100 to 800 psi and step (h) comprises flowing said second adhesive component fluid pressurized in a range of 100 to 800 psi.

6. The method of claim 5 wherein step (j) comprises additionally pressurizing at least one of said first aerated adhesive component fluid, said second aerated adhesive component fluid or adhesive by a range of 10 to 150 psi.

7. The method of claim 1 wherein step (k) comprises dispensing said adhesive onto said work surface in a spray form.

8. A method of dispensing an adhesive comprising the steps of:

(a) providing a first adhesive component;

(b) providing a second adhesive component fluid;

(c) providing a mixing tip having a mixing tip passage extending from an upstream mixing tip passage inlet to a downstream mixing tip passage outlet;

(d) flowing said first adhesive component fluid to said mixing tip passage;

(e) flowing said second adhesive component to said mixing tip passage independently of said first adhesive component fluid;

(f) mixing said first adhesive component fluid and second adhesive component fluids within said mixing tip passage to form an adhesive;

(g) aerating at least one of said first adhesive component fluid, said second adhesive component fluid upstream of said mixing tip passage inlet;

(h) dispensing said adhesive from said mixing tip passage onto a work surface; and (i) curing said adhesive on said work surface to form a cured adhesive, said cured adhesive comprising a plurality of cell bodies, one or more of said cell bodies comprising a cell wall surrounding a void and an interior cell body diameter extending between opposed cell walls and wherein the average cell body diameter of said plurality of cell bodies is 170 micrometers.

9. The method of claim 8 wherein step (d) comprises flowing said first adhesive component fluid pressurized in a range of 100 to 800 psi and step (e) comprises flowing said second adhesive component fluid pressurized in a range of 100 to 800 psi.

10. The method of claim 9 wherein step (g) comprises additionally pressurizing at least one of said first aerated adhesive component fluid, said second aerated adhesive component fluid or adhesive by a range of 10 to 150 psi.

11. A method of dispensing an adhesive comprising the steps of:

(a) providing a first adhesive component;

(b) providing a second adhesive component fluid;

(c) providing a mixing tip having a mixing tip passage extending from an upstream mixing tip passage inlet to a downstream mixing tip passage outlet;

(d) flowing said first adhesive component fluid to said mixing tip passage;

(e) flowing said second adhesive component to said mixing tip passage;

(f) mixing said first adhesive component fluid and second adhesive component fluid upstream of said mixing tip passage outlet to form an adhesive;

(g) aerating at least one of said first adhesive component fluid, said second adhesive component fluid or adhesive upstream of said mixing tip passage inlet;

(h) dispensing said adhesive from said mixing tip passage onto a work surface; and (i) curing said adhesive on said work surface to form a cured adhesive, wherein said cured adhesive comprises a plurality of cell bodies, one or more of said cell bodies comprising a cell wall surrounding a void and an interior cell body diameter extending between opposed cell walls and wherein the average cell body diameter of said plurality of cell bodies is 170 micrometers.

12. The method claim 11 wherein step (e) comprises flowing said second adhesive component to said mixing tip passage independently of said first adhesive component fluid.

13. The method of claim 12 wherein step (d) comprises flowing said first adhesive component fluid pressurized in a range of 100 to 800 psi and step (e) comprises flowing said second adhesive component fluid pressurized in a range of 100 to 800 psi.

14. The method of claim 13 wherein step (g) comprises additionally pressurizing at least one of said first aerated adhesive component fluid, said second aerated adhesive component fluid or adhesive by a range of 10 to 150 psi.

15. The method of claim 12 wherein step (g) comprises aerating at least one of said first adhesive component fluid or said second adhesive component in at least one of said first head passage or said second head passage.

16. The method of claim 11 wherein step (h) comprises dispensing said adhesive onto said work surface in a spray form.

17. A cured adhesive formed by a process comprising the steps of:

(a) providing a first adhesive component;

(b) providing a second adhesive component fluid;

(c) providing a mixing tip having a mixing tip passage extending from an upstream mixing tip passage inlet to a downstream mixing tip passage outlet;

(d) flowing said first adhesive component fluid to said mixing tip passage;

(e) flowing said second adhesive component to said mixing tip passage independently of said first adhesive component fluid;

(f) mixing said first adhesive component fluid and second adhesive component fluids within said mixing tip passage to form an adhesive;

(g) aerating at least one of said first adhesive component fluid, said second adhesive component fluid or said adhesive upstream of said mixing tip passage inlet;

(h) dispensing said adhesive from said mixing tip passage onto a work surface; and (i) curing said adhesive on said work surface to form a cured adhesive comprising a plurality of cell bodies, one or more of said cell bodies comprising a cell wall surrounding a void and an interior cell body diameter extending between opposed cell walls and wherein the average cell body diameter of said plurality of cell bodies is 170 micrometers.

18. The cured adhesive of claim 17 wherein step (d) comprises flowing said first adhesive component fluid pressurized in a range of 100 to 800 psi and step (e) comprises flowing said second adhesive component fluid pressurized in a range of 100 to 800 psi.

19. The cured adhesive of claim 17 wherein step (g) comprises additionally pressurizing at least one of said first aerated adhesive component fluid, said second aerated adhesive component fluid or said adhesive by a range of 10 to 150 psi.

20. The cured adhesive of claim 17 wherein wherein step (h) comprises dispensing said adhesive onto said work surface in a spray form.

* * * * *